L. ROGERS.
SUCKER-ROD.

No. 191,180. Patented May 22, 1877.

WITNESSES.
R. W. Wrenshall
James D. Hay

INVENTOR
Luman Rogers
by Bakewell & Kerr
Atty's

UNITED STATES PATENT OFFICE.

LUMAN ROGERS, OF PITTSBURG, PENNSYLVANIA.

IMPROVEMENT IN SUCKER-RODS.

Specification forming part of Letters Patent No. 191,180, dated May 22, 1877; application filed November 8, 1876.

*To all whom it may concern:*

Be it known that I, LUMAN ROGERS, of Pittsburg, in the county of Allegheny and State of Pennsylvania, have invented a new and useful Improvement in Sucker-Rod; and I do hereby declare the following to be a full, clear, and exact description thereof, reference being had to the accompanying drawing, forming part of this specification, in which—

Figure 1:
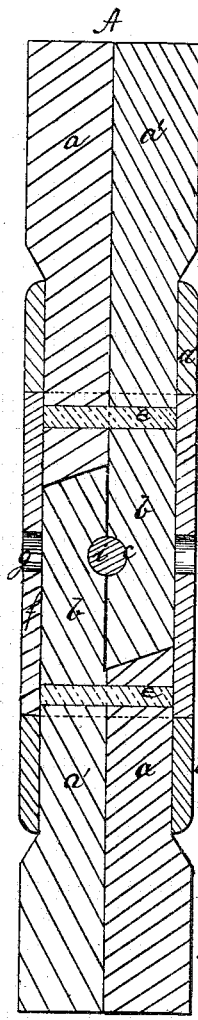
Figure 2:
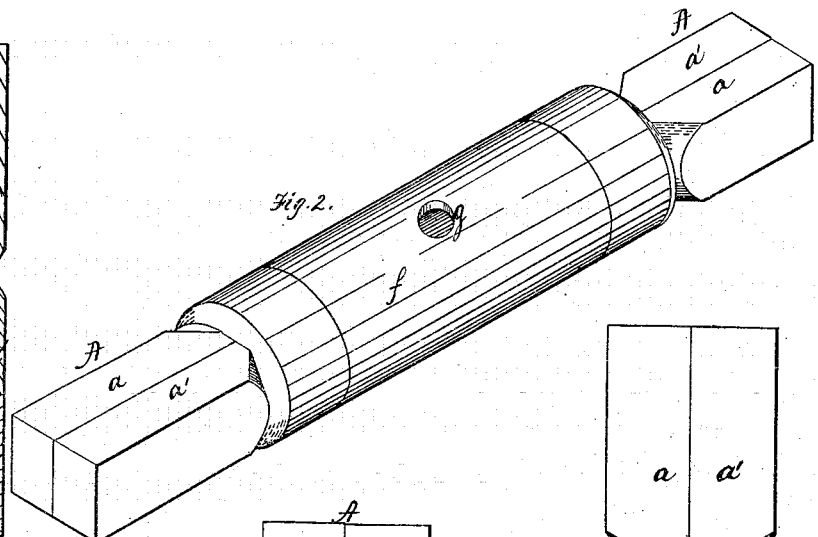
Figure 3:
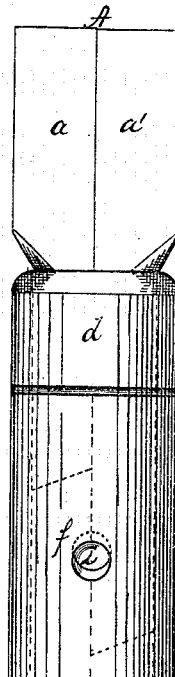
Figure 4:
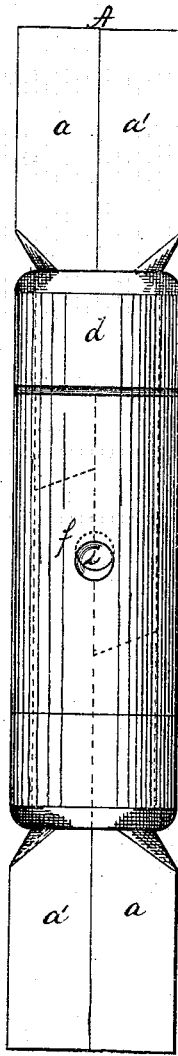

Figure 1 is a longitudinal section of a joint formed in accordance with my invention. Fig. 2 is a perspective view of the same. Fig. 3 is a detached view of one-half thereof, and Fig. 4 is an elevation of the joint, showing the relative position of the key and sleeve or keeper.

Like letters refer to like parts wherever they occur.

My invention relates to the construction of pump-rod and similar connections.

Heretofore, in the manufacture of pump-rod joints, each rod or section, if formed in a single piece, required to be upset, tapped, or threaded, and, if formed in more than one piece, had to be welded before it was tapped and threaded. The time and labor involved in welding up and threading the sections greatly enhanced the difficulty and cost of manufacture, and, in addition thereto, unless the threaded connections were nicely made and fitted, the joint would wear loose and become unserviceable from the constant motion and strain to which it was subjected.

The main object, therefore, of the present invention is to obtain a joint or connection which can be produced without welding or tapping and threading.

I will now proceed to describe my invention, so that others skilled in the art to which it appertains may apply the same.

In the drawing, A indicates the rod, which may be formed single or in two pieces, $a\ a'$, as preferred, and terminates in a lap, $b$, which may be half-round, rectangular, or other desired shape, in cross-section, and having a recess, $c$, upon its inner lapping face. Just back of the lap is a collar, $d$, which, in a single piece, may be formed with the same, but where the rod is in two pieces, $a\ a'$, this collar $d$ is preferably shrunk on, and the two pieces $a\ a'$ are locked by a pin through them, or by a recess and lug or key, as indicated in dotted lines at $e$. $f$ indicates a sleeve or keeper, which may be of a length equal to the distance between two collars, $d$, and is fitted to slip and move freely on the laps $b\ b$, or may be somewhat shorter, as represented in Fig. 4, the intervening space and lost motion being taken up by a spring-washer, $f'$. This sleeve is provided with an opening, $g$, through which a key or pin, $i$, is inserted to lock the laps $b\ b$ when the two sections A A are in position, as shown in Fig. 1. After the key $i$ has been inserted through opening $g$ of the sleeve, the sleeve is either turned or slid upon the joint, so as to carry the opening $g$ out of line with the key, and thus constitute a keeper insuring the safety of the lock. Or, the pin or key $i$ may be of a length equal to the outside diameter of the sleeve or keeper $f$, which, being slightly clinched, will also insure the safety of the lock. This sleeve or keeper $f$ may be "fixed" or formed upon one of the parts instead of being made so as to slide or revolve. This can be done by extending one of the collars.

In manufacturing the joint or connection described, suitably-grooved rolls may be employed, and a bar or bars produced, thereby having the part A ($a\ a'$) either round, flat, square, or concavo-convex, or other desired shape, and with the overlap $b$ preferably half-round or rectangular, the recess $c$ being likewise formed in the rolls. The collar $d$ is then shrunk on, or otherwise secured to, the part A or parts $a\ a'$, and a sleeve, which may be readily constructed in any of the well-known ways, and perforated for the passage of the key or pin, completes the joint, the whole being rapidly made by well-known rolls, and without the tedious processes of welding, tapping, and threading.

Among the additional advantages of my improved joint are strength and durability.

The ends of the pieces $a\ a'$, which are embraced by the collar or collars, may be welded together before the collar is formed or placed on them. The locking pin or key may be inserted through a suitable hole extending transversely through the laps.

Having thus described my invention, what I claim, and desire to secure by Letters Patent, is—

1. The sucker-rod or similar joint section, having a lap, and formed of two or more pieces secured by a pin or key and collar, substantially as and for the purpose specified.

2. The pump-rod or similar connection, consisting of the lap-joint, the key or pin and sleeve or keeper, the motion of the keeper being restricted by the fixed collars, substantially as and for the purpose specified.

3. In a joint or connection for sucker-rods and similar shafting, the combination of the lap-joint, the pin or key, the sliding sleeve or keeper, and the annular spring-washer, substantially as and for the purpose specified.

In testimony whereof I, the said LUMAN ROGERS, have hereunto set my hand.

LUMAN ROGERS.

Witnesses:
JAMES I. KAY,
JAMES K. BAKEWELL.